Patented Apr. 20, 1937

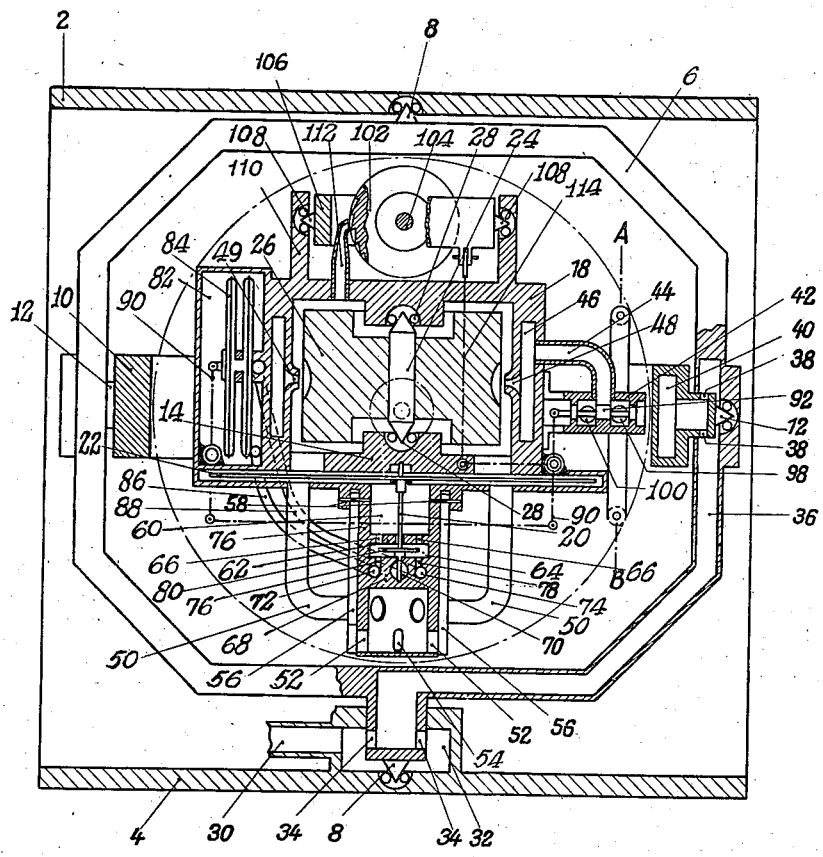
Fig. 1
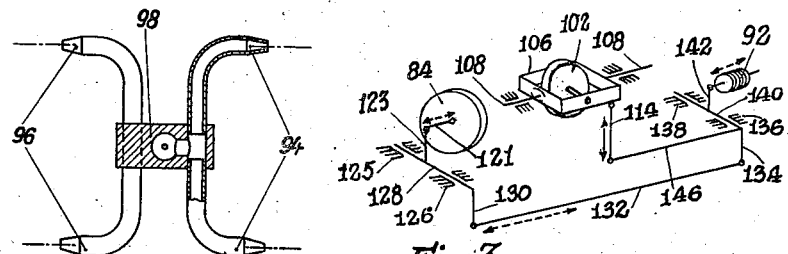
Fig. 2
Fig. 3.

2,077,849

UNITED STATES PATENT OFFICE 2,077,849

COMPASS FOLLOW-UP

Waldemar Möller and Gerhard Zoege von Manteuffel, Berlin-Zehlendorf, Germany

Application May 4, 1934, Serial No. 723,854
In Germany May 8, 1933

11 Claims. (Cl. 33—204)

This invention relates to compasses, more particularly for aircraft, and one of the objects of the invention is to provide a compass that is supported or steadied by suitable means as for example by a gyroscope and which shall meet all demands, and in all positions and under all conditions shall give a correct and perfectly undisturbed indication of the magnetic north direction and shall furnish a perfectly reliable reading.

Broadly the invention also contemplates the provision in a conveyance, in aircraft for example, of apparatus to fix the direction of a first dynamic field (the north-south direction for example) with relation to the undisturbed surface level of a second dynamic field subjected to strong disturbances (for example with relation to the horizontal plane), using for this purpose supporting or steadying means (a gyroscope rotatable about a vertical axis for example), in respect to said second dynamic field, and a direction indicator (a magnet system rotatable about a vertical axis for example) for said first dynamic field, supported by said supporting means, and characterized by the fact that a body member rotatable about an axis has said axis confined or held by said supporting means to the direction of said second dynamic field (the true vertical for example) and is sumultaneously adjusted by said direction indicator about said confined axis in the direction of said first dynamic field, said supporting means being preferably provided with means responsive to said second dynamic field to release or initiate, or disturb the equilibrium of pairs of forces which tend to return the axis of rotation of said supporting means to the direction of said second dynamic field.

These and such other aims and objects of the invention as may hereinafter appear will be readily understood from the following description taken in connection with the accompanying drawing of one embodiment of the invention herein given for illustrative purposes, the true scope of the invention being more particularly pointed out in the appended claims.

In the drawing:

Fig. 1 is a vertical section of one illustrative embodiment of the invention; and Fig. 2 is a sectional elevation of line A—B of Fig. 1.

Fig. 3 shows diagrammatically a valve controlling linkage system.

The apparatus will preferably be contained in a casing, which will be secured in a suitable position on the frame or body of the aircraft or other conveyance in which the apparatus is to be used. The upper and lower plates of said casing are shown in section at 2 and 4 in Fig. 1. In the illustrative embodiment of the invention shown in Fig. 1, a frame or ring 6 is journaled at 8—8 in said plates 2 and 4 for rotation about a vertical axis. A Cardan or gimbal frame or ring 10 is journaled at 12—12 in said frame or ring 6 and in turn has journaled therein for rocking movement upon a horizontal axis (not shown) perpendicular to the axis of said journal 12, a magnet system supporting means, including the magnet system housing 14. Said housing 14 comprises two parts 16 and 18. The spindle 20 carrying the magnet system 22 is journaled in the part 16. The spindle 24 of a gyroscope rotor 26 is journaled for rotary movement at 28 in said housing part 18, the axis of rotation of said rotor being in parallelism with the axis of the spindle 20 about which said magnet system 22 is adapted to rotate. It will be apparent that rapid rotation of said rotor 26 will tend to maintain its axis of rotation in its normal or correct position in space, thereby to maintain the compass spindle in the truly vertical direction, so that said compass being uninfluenced by lateral accelerations will indicate the true magnetic north direction.

It is well known that a free gyroscope gradually undergoes deviations from its initial position or direction, by reason of the unavoidable friction in the journals and the present invention therefore contemplates the provision of suitable means to overcome or correct this defect. In the illustrative embodiment of the invention said means conveniently comprises devices responsive to the action of gravity which upon any tendency of the magnet system to deviate from the true vertical, release or render operative a force or system of forces which immediately acts to restore said magnet system spindle to its true vertical position. In the illustrative embodiment of the invention said devices conveniently comprise two pairs of pendulating members which control outlets for compressed air. While any suitable means may be used to drive the gyroscope rotor 26, it has therefore been found convenient to drive the same with compressed air which may be supplied from any suitable source not shown through a pipe 30 to the journal bearing 32 from which it passes through openings 34 into a passage 36 provided in the frame 6 and thence through ports 38—38 into a chamber 40 provided in the secondary Cardan suspension frame 10. From said chamber the compressed air passes into the bearings of the aforementioned horizontal shaft (not shown), said bearings being identical with bearings 12, 38, and thence into an annular chamber 46 provided in the housing part 18. From this annular chamber the compressed air issues through opposed outlet ports 48—49 to drive the rotor 26. From the interior of the housing part 18 the compressed air passes through pipes 50—50 into the lower part of the other housing part 16 whence the compressed air will issue through two pairs of ports 52—52 and 54—54. Only one of the latter is visible in Fig. 1. The two ports 52 are in a plane at right angles to that containing the ports 54. A pair of members 56—56 are pivoted at 58 to opposite sides of said housing part 16 and are thus adapted to pendulate in front of said ports 52, 52 responsive to the action of gravity. A similar pair of pendulating members, operating in the same manner, are adapted to cooperate similarly with the two ports 54. They are not shown in the drawing.

When the axes of the magnet system and of the rotor 26 are exactly perpendicular, the pendulating members 56, 56 will be so positioned relatively to the two ports 52, 52 that an equal amount of compressed air will escape from each of said ports. If, however, the spindle 20 of the magnet system deviates from the perpendicular, the arrangement is such that one of the outlet ports 52 will be more covered by its cooperating pendulating member and the other port 52 will be more uncovered by its pendulating member. The strength of the current of air issuing from one of said ports 52 will differ from the strength of the air current issuing from the opposed port 52, so that by the action of said air currents upon the ambient air the housing 14 will be swung toward the side from which issues the weaker current about an axis perpendicular to the axis about which said pendulating members 56, 56 swing. The other pair of pendulating members are arranged in the same manner and cooperate in the same way with their outlet ports 54, the housing 1 being swung in a direction transversely or at right angles to that in which it is swung by the operation of the pendulating members 56. Every deviation of the axis 20 of the magnet system from the vertical or from the direction in which gravity acts upon said system, thus releases or renders operative forces, which in the illustrative embodiment of the invention act upon the ambient air and tend to return the spindle 20 to its original normal position or direction. The gyroscope 26 suffices to keep the magnet spindle 20 sufficiently near the true vertical direction in the case of disturbances of relatively short duration due to the forces of acceleration; the compressed air streams issuing from the outlet ports 52, 52 and 54, 54 prevent slow deviations of the axes of said gyroscope and magnet system from a vertical position due to precessional movements of the gyroscope.

Preferably the magnet system itself will not be used to indicate the direction but the Cardan system frame or ring 6 will be used for this purpose, and in accordance with the invention, suitable means are therefore provided to cause said frame to take part in or move with said magnet system in the latter's movement about the axis of its spindle 20 said ring 6 thus conveniently constituting follow-up means. Said frame 6 will be provided with the usual compass graduations in the form of a compass card or any other suitable arrangement. In the illustrative embodiment of the invention compressed air will preferably be used to move said frame 6 with said magnet system. To this end the interior of the compass housing 18 communicates with the chamber 60 in the housing part 16. A partition 62 forms a second chamber 64 in said part 16, said partition being provided with two ports 66, 66. The chamber 64 is separated from the lower chamber having the ports 52 by means of a wall 68 provided with three bores or passages 70, 72, 74. The passage 70 opens into the atmosphere and communicates with the chamber 64. Passages 72 and 74 communicate with said chamber 64 through ports 76, 78 respectively. Compressed air projected from the chamber 60 through said ports 66, 66 will thus enter said ports 76, 78 and passages 72, 74, respectively, said ports 66, 66 being in substantial alignment with said ports 76, 78 respectively.

Means are herein provided for varying the effects of the fluid pressure by controlling the passage of the fluid pressure from said ports 66, 66 to said ports 76, 78, so as to vary, relative to each other, the degree of fluid pressure delivered by said ports 66, 66 to said ports 76, 78 respectively. Said controlling means may be of any suitable construction without departing from the scope of the invention and herein conveniently comprises a disk 80 secured eccentrically to the magnet system spindle 20 in a plane between said ports 66, 66 on the one hand and said ports 76, 78 on the other, the arrangement being such that the ports 76, 78 will be more or less covered by said disk according to its angular position. The relation between the degree of fluid pressure delivered to said ports 76, 78 respectively will thus vary according to the angular position of said disk, and correspondingly the fluid pressure in said passages 72 and 74 respectively.

A chamber 82 is provided upon one side of the housing part 18, said chamber containing fluid pressure responsive means, herein comprising conveniently a plurality of diaphragm chambers, herein two such diaphragm chambers 84, 84 being provided. The chamber 82 is connected by a passage 86 with the passage 72 and the interior of said diaphragm chambers is connected by a passage 88 with the said passage 74, so that said differential pressure diaphragm chambers are adjusted in correspondence to the position of the magnet system 22 relative to the housing 18. Movements imparted to said differential pressure diaphragms are transmitted through a lever and link system to a slide valve 92 working in said previously mentioned slide valve chamber 42, said valve 92 controlling two sets of nozzles 94 and 96 respectively (Fig. 2). For this purpose the compressed air chamber 46, which communicates by pipe 44 with said slide valve casing 42, is, by movement of said slide valve 92, caused to communicate with either an opening 98 leading to the jet nozzle pair 94 or with an opening 100 leading to the jet nozzle pair 96. In the one case compressed air will be projected from the jet nozzle pair 94 and in the other case from the jet nozzle pair 96. As said pairs of jet nozzles are located perpendicularly to the plane of the Cardan system frame 6, and are directed in opposite directions the movement communicated to said frame 6 will be either clockwise or contraclockwise about its axis 8—8 according to which one of said jet nozzle pairs is operated. Said frame 6 will thus take part in or follow the movement of said magnet system 22 about the axis of its spindle.

The above referred to linkage system is diagrammatically shown in Fig. 3, wherein the diaphragm of the diaphragm chamber 84 is connected by link 121 to a shaft 123 journalled in fixed bearings 125, 126. Said shaft will thus be rotated correspondingly to the movements of said diaphragm, that is to say, to the movements of the magnet system and these movements will be communicated to the valve 29 through lever 130, rod 132, lever 134, shaft 140 journalled in fixed bearings 136, 138, and lever 142.

Means will preferably be provided in accordance with the invention to render said frame 6 uninfluenced or unaffected by oscillations of short duration of the magnet system. Any suitable means may be provided for this purpose within the scope of the invention, but in the illustrative embodiment of the invention a second gyroscope 102 is conveniently provided for this purpose. Said gyroscope 102 rotates about a horizontal axis 104 mounted in a frame 106 which is rotatable about a horizontal axis extending through journals 108 in a frame or brackets 110 carried by the housing 18. Said gyroscope 102 operates as a turn indicator gyroscope and produces precessional movements of the gyroscope frame 106 about the journals 108 correspondingly to the speed of rotation of the frame 6 about the axis passing through the journals 8.

Said gyroscope 102, may be driven by any suitable means, compressed air being herein conveniently used for that purpose which is supplied to the periphery of the gyroscope rotor through a pipe 112 which communicates with the interior of the housing part 18. The damping action of said gyroscope 102 is increased by connecting its frame 106 in the manner of a restoring means or device with the slide valve member 92 by means of a suitable lever and link connection diagrammatically represented in Fig. 3. Said lever and link connection herein comprises a link 114 connecting the gyroscope frame 106 to a lever 146 which is in turn connected to shaft 140, the latter being connected by lever 142 to said valve 92. The angular speed imparted to the frame 6 by the compressed air jets issuing from the pairs of jet nozzles 94 or 96 causes the gyroscope frame 106 to precess and these precessional movements return the slide valve member 92 to its median position by means of said lever and link system 114, thus gradually diminishing the jets of compressed air issuing from said jet nozzle pairs 94 or 96, so that said frame 6 is brought to rest aperiodically.

The magnet system and said gyroscope therefore act upon said vertical frame in a manner analogous to the action of a direction indicator on the automatic steering means and of a measuring means acting responsive to the turning speed, in some cases in combination or cooperation with restoring means.

It will be seen that the stability is increased, in the case of automatic controls, by causing other forces or influences to act upon the control, and which are derived from the speed of rotation or turning speed and in certain cases also from the acceleration of the turning movement, and also restoring devices.

We are aware that our present invention may be embodied in other specific forms from that herein described without departing from the spirit or essential attributes thereof, and we therefore desire the present embodiment of said invention to be considered in all respects as illustrative and not restrictive, reference being had to the appended claims rather than to the foregoing description to indicate the scope of the invention.

Said frame 6 could be used for actuating a steering indicator, an automatic steering apparatus or one or more supplementary or additional compass cards, as will be readily understood by those skilled in the art.

We claim:

1. A compass follow-up comprising, in combination, a magnet system rotatable about a vertical axis; a stabilizing gyroscope with a vertical spinning axis; a turn-responsive gyroscope, including a rotor having a horizontal spinning axis and a rotor bearing frame mounted for oscillation in horizontal bearings at right angles to said spin axis; a follow-up ring rotatable about a fixed substantially vertical axis; a common supporting member for said magnet system and said gyroscopes, means journalling said supporting member in said follow-up ring for freedom about mutually normal horizontal axes; and means partially controlled by said turn-responsive gyroscope and rendered operative responsive and corresponding to rotary movement of said supporting member away from normal relation relatively to said magnet system, adapted to rotate said follow-up ring journalling means and supporting member to restore said normal relation.

2. A compass follow-up comprising, in combination, a magnet system rotatable about a vertical axis; a gimbal ring; a supporting member for said magnet system, journaled for horizontal oscillation in said gimbal ring; a follow-up ring pivotally supporting said gimbal ring, about a horizontal axis at right angles to said first-named horizontal oscillation axis, said follow-up ring being rotatable about a fixed substantially vertical axis; differential air flow means controlled by the relative angular displacement of said supporting member and said magnet system, including a pair of nozzles; means for conducting air under pressure to said nozzles; a second pair of nozzles positioned opposite to and adapted to receive at least a part of the air flow from the nozzles of said first pair respectively; means adapted to intercept said air flow and controlled by said magnet system; means adapted to exert a torque about the vertical axis of said follow-up ring, including nozzles emitting jets of air under pressure directed against the ambient air; means for conducting air to said nozzles; and means responsive to differential pressure created by said magnet system controlled air flow means to control the admission of air to said nozzles.

3. For use in a conveyance, the combination of a gyroscope spinning about a vertical axis; a magnet system rotatable about a vertical axis; a common housing supporting said gyroscope and magnet system; a universal suspension for said housing including a Cardan frame and a ring carrying the journal about which said flame is rotatable, said ring being rotatable about a fixed vertical axis in said conveyance; a second gyroscope carried by said housing for spinning about a substantially horizontal axis and for precession about a second horizontal axis at right angles to said first axis; power means brought into action by relative rotation of said ring and magnet system from a normal relation, tending to apply a force to move said support to restore said relation, and means operated by precession of said second gyroscope, as a result of said restoring means, tending to diminish the power applied by said power means.

4. A compass follow-up comprising, in combination, a magnet system; supporting means in and relatively to which said magnet system is rotatable about a vertical axis; a stabilizing gyroscope having a vertical spinning axis and a second turn-responsive gyroscope having a horizontal spinning axis and including a rotor bearing member rotatable about a horizontal axis at right angles to the spin axis, both of said gyroscopes carried by said supporting means; a universal mounting, including follow-up means, in which said supporting means is mounted for universal movement, said follow-up means being rotatable about a fixed substantially vertical axis; talk applying means adapted to rotate said follow-up means about said vertical axis, said talk applying means being partially controlled by said second gyroscope and rendered operative by relative rotary movement of said magnet system and said supporting means, thereby restoring the normal relation between said magnet system and said supporting means.

5. A compass follow-up comprising, in combination, a magnet system rotatable about a vertical axis; a stabilizing gyroscope with a vertical spinning axis; a common supporting member for said magnet system and said gyroscope; airports in said supporting member; means for conducting air under pressure to said airports; pendulous shutters cooperating with said airports and adapted to control air jets emitted from said airports to apply a righting torque to said supporting member upon tilting movement of the same; a universal mounting on horizontal axes for said supporting member, including a Cardan ring; a follow-up ring supporting said Cardan ring, said follow-up ring being rotatable upon a fixed substantially vertical axis; differential air flow means controlled by relative angular deviation of said magnet system and supporting member and including a pair of nozzles; means for conducting air under pressure to said nozzles; a second pair of nozzles positioned opposite to and adapted to receive at least a part of the air flow from the nozzle of said first pair respectively; means adapted to intercept the air flow between the respective pairs of nozzles and controlled by said magnet system; means adapted to exert a torque about the vertical axis of the follow-up ring, including third nozzles emitting jets of air under pressure against the ambient air; means for conducting air to said third nozzles; and means responsive to differential pressures between said first and second pair of nozzles adapted to control the admission of air to said third nozzles.

6. A compass follow-up comprising, in combination, a magnet system rotatable about a vertical axis; a turn-responsive gyroscope, including a rotor having a horizontal spinning axis carried by a rotor bearing frame; a Cardan ring; a common supporting member for said magnet system and said gyroscope mounted for horizontal oscillation in said Cardan ring, said rotor bearing frame being mounted for oscillation about horizontal pivots in said supporting member; a follow-up ring supporting said Cardan ring, said follow-up ring being rotatable about a fixed substantially vertical axis; differential air flow means partly controlled by tipping movement of said rotor bearing frame of said turn-responsive gyroscope and rendered operative upon relative azimuthal deviation of said magnet system and said supporting member, said air flow means including a pair of nozzles; means for conducting air under pressure to said nozzles; a second pair of nozzles positioned opposite to and adapted to receive at least a part of the air flow from the nozzles of said first pair respectively; means adapted to intercept the air flow between the respective pairs of nozzles and controlled by said magnet system; means adapted to exert a torque about the vertical axis of the follow-up ring, including third nozzles emitting jets of air under pressure against the ambient air; means for conducting air to said third nozzles; and means responsive to differential pressures between said first and second pair of nozzles adapted to control the admission of air to said third nozzles.

7. A compass follow-up comprising, in combination, a magnet system rotatable about a vertical axis; a turn-responsive gyroscope, including a rotor having a horizontal spinning axis carried by a rotor bearing frame mounted for oscillation about horizontal pivots at right angles to said spin axis; a stabilizing gyroscope having a vertical spinning axis; a common supporting member for said magnet system and said gyroscopes; a universal mounting about horizontal axes for said supporting member, including a Cardan ring and a follow-up ring pivotally supporting said Cardan ring, said follow-up ring being rotatable about a fixed substantially vertical axis; airports in said supporting member; means for conducting air under pressure thereto; pendulous shutters cooperating with said airports to control air jets emitted from the latter to apply a righting torque to said supporting member upon tilting movement of the same; differential air flow means controlled by relative azimuthal deviation of said magnet system and supporting member and including a pair of nozzles; means for conducting air under pressure to said nozzles; a second pair of nozzles positioned opposite to and adapted to receive at least a part of the air flow from the nozzles of said first pair respectively; means adapted to intercept said air flow between the respective pairs of nozzles and controlled by said magnet system; means adapted to exert a torque about the vertical axis of said follow-up ring, including third nozzles emitting jets of air under pressure against the ambient air; means for conducting air to said nozzles; means responsive to differential pressures between said first and second pair of nozzles adapted to control the admission of air to said nozzles; and an operative connection between said rotor bearing frame of said turn-responsive gyroscope and said last-named air-controlled means, whereby said turn-responsive gyroscope tends to diminish the action of said differential pressure responsive means.

8. A compass follow-up comprising, in combination, a magnet system rotatable about a vertical axis; a turn-responsive gyroscope, including a rotor having a horizontal spinning axis and a rotor bearing frame mounted for oscillation about horizontal pivots at right angles to said spin axis; a common supporting member for said magnet system and said gyroscope, universally mounted for oscillation about horizontal pivots in a Cardan ring and a follow-up ring pivotally supporting said Cardan ring, said follow-up ring being rotatable about a fixed substantially vertical axis; differential air flow means controlled by relative azimuthal deviation of said magnet system and said supporting member, including a pair of nozzles; means for conducting air under pressure to said nozzles; a second pair of nozzles positioned opposite to and adapted to receive at least a part of the air flow from the nozzle of said first pair respectively; means adapted to intercept said air flow between the respective pairs of nozzles and controlled by said magnet system; means adapted to exert a torque about the vertical axis of said follow-up ring, including third nozzles emitting jets of air under pressure against the ambient air; means for conducting air to said third nozzles; a slide valve controlling the supply of air to said third nozzles; means responsive to differential pressure between said first and second pair of nozzles to actuate said slide valve; and a link system connecting the piston of said slide valve to the rotor bearing frame of said turn-responsive gyroscope.

9. A compass follow-up comprising, in combination, a magnet system rotatable about a vertical axis; a turn responsive gyroscope including a rotor having a horizontal spinning axis and a rotor bearing frame mounted for oscillation about horizontal pivots at right angles to said spin axis; a stabilizing gyroscope having a vertical spinning axis; a common supporting member for said magnet system and said gyroscopes; a universal mounting on horizontal axes for said supporting member, including a gimbal ring and a follow-up ring pivotally supporting the latter, said follow-up ring being rotatable about a fixed substantially vertical axis; airports in said supporting member; means for conducting air under pressure to said airports; pendulous shutters cooperating with said airports to control air jets emitted from said airports, to apply a righting torque to said supporting member upon tilting movement of the same; differential air flow means controlled by relative azimuthal deviation of said magnet system and said supporting member and including a pair of nozzles; means for conducting air under pressure to said nozzles; a second pair of nozzles positioned opposite to and adapted to receive at least a part of the air flow from the nozzles of said first pair respectively; means adapted to intercept said air flow between the respective pairs of nozzles and controlled by said magnet system; means adapted to exert a torque about the vertical axis of said follow-up ring, including third nozzles emitting jets of air under pressure against the ambient air; means for conducting air to said third nozzles; a slide valve controlling the supply of air to said third nozzles; means responsive to differential pressures between said first and second pairs of nozzles to actuate said slide valve; and a link system connecting the piston of said slide valve to the rotor bearing frame of said turn-responsive gyroscope.

10. A compass follow-up comprising, in combination, an element responsive to the earth's magnetic field; follow-up means rotatable in azimuth; power means to rotate said follow-up means in azimuth; control means responsive to relative azimuthal deviation of said follow-up means and said element and adapted to control said power means; a gyroscope including a rotor and a rotor bearing member carried by said follow-up means, said gyroscope being rotatable in precession about an axis at right angles to the spin axis of said rotor responsive to rotary movement of said follow-up means; and an operative connection between said control means and said rotor bearing member of said gyroscope, whereby the power applied by said power means is diminished upon rotation of said follow-up means in azimuth.

11. A compass follow-up comprising, in combination, a magnetic system rotatable in azimuth; follow-up means rotatable in azimuth; power means to rotate said follow-up means in azimuth; control means responsive to relative azimuthal deviation of said follow-up means and said magnetic system and adapted to control said power means; a gyroscope, including a rotor and a rotor bearing member carried by said follow-up means, said gyroscope being rotatable in precession about an axis at right angles to the spin axis of said rotor responsive to rotary movements of said follow-up means; and an operative connection between said control means and said rotor bearing member of said gyroscope, whereby the power applied by said power means is diminished upon rotation of said follow-up means in azimuth.

WALDEMAR MÖLLER.
GERH. ZOEGE von MANTEUFFEL.